United States Patent
Watanabe et al.

(10) Patent No.: US 6,863,255 B2
(45) Date of Patent: Mar. 8, 2005

(54) SOLENOID HAVING FLUID ACCUMULATING AND PLUNGER CHAMBERS

(75) Inventors: Koji Watanabe, Fujisawa (JP); Takuya Kudo, Fujisawa (JP); Norio Uemura, Fujisawa (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 10/204,409

(22) PCT Filed: Feb. 28, 2001

(86) PCT No.: PCT/JP01/01494

§ 371 (c)(1),
(2), (4) Date: Nov. 6, 2002

(87) PCT Pub. No.: WO01/65158

PCT Pub. Date: Sep. 7, 2001

(65) Prior Publication Data

US 2003/0136931 A1 Jul. 24, 2003

(30) Foreign Application Priority Data

Feb. 29, 2000 (JP) ........................................ 2000-057983
Jan. 26, 2001 (JP) ........................................ 2001-018894

(51) Int. Cl.[7] ............................................. F16K 31/02
(52) U.S. Cl. .................................. 251/129.21; 251/282
(58) Field of Search ....................... 251/129.15, 129.21, 251/900, 282, 335.1

(56) References Cited

U.S. PATENT DOCUMENTS

| | | | | |
|---|---|---|---|---|
| 3,614,057 A | * | 10/1971 | Hospe | 251/335.1 |
| 4,061,157 A | * | 12/1977 | Hanssen | 251/214 |
| 4,548,047 A | | 10/1985 | Hayashi et al. | 62/160 |
| 5,213,124 A | * | 5/1993 | Costa | 251/43 |
| 5,402,093 A | * | 3/1995 | Gibas et al. | 251/129.15 |
| 5,810,329 A | * | 9/1998 | Baron et al. | 251/129.15 |
| 5,918,635 A | * | 7/1999 | Wang et al. | 251/129.15 |
| 5,975,064 A | * | 11/1999 | Krimmer et al. | 251/129.15 |

FOREIGN PATENT DOCUMENTS

| | | |
|---|---|---|
| DE | 196 07 811 A1 * | 9/1997 |
| JP | 58-081277 | 5/1983 |
| JP | 58-081278 | 5/1983 |
| JP | 61-102006 | 6/1986 |
| JP | 08-086375 | 4/1996 |
| JP | 09-089145 | 3/1997 |

\* cited by examiner

Primary Examiner—John Bastianelli
(74) Attorney, Agent, or Firm—Jacobson Holman PLLC

(57) ABSTRACT

A solenoid improvement has been achieved in terms of abrasion resistance. A fluid accumulating chamber Q is formed substantially coaxially with a plunger chamber P and on the opposite side of a center post 4 through the intermediation of the plunger chamber P. On the outer peripheral side of the rod 6, there is provided a first bearing 7 for separating the plunger chamber P and the fluid accumulating chamber Q from each other.

8 Claims, 8 Drawing Sheets (a)

(b)

SOLENOID HAVING FLUID ACCUMULATING AND PLUNGER CHAMBERS

This is a nationalization of PCT/JP01/01494 filed Feb. 28, 2001 and published in Japanese.

TECHNICAL FIELD

This invention relates to a solenoid that is suitable for use in a solenoid valve or the like to be used in controlling, for example, various types of hydraulic and pneumatic apparatuses.

BACKGROUND ART

FIG. 11 shows an example of a conventional solenoid of this type. FIG. 11 is a schematic sectional view of a conventional solenoid.

This solenoid 100 is used as the driving means of a control valve, such as a spool valve for controlling, for example, hydraulic pressure. It is mounted in a liquid-tight fashion in a housing 200 filled with oil serving as the fluid through the intermediation of an O-ring 201. That is, a valve or the like (not shown) is mounted to the forward end of a rod 106 constituting the solenoid 200, and is driven in a state in which it is immersed in an oil (O) to thereby perform hydraulic pressure control or the like.

This solenoid 100 comprises a plunger 103 made of a magnetic material and slidably inserted into a bearing 102 provided in a plunger chamber P formed inside a hollow solenoid main body 101, a center post 104 formed of a magnetic material and arranged opposite to and coaxially with the plunger 103, a cap 105 which is provided on the opposite side of the center post 104 to regulate axial movement of the plunger 103 and which closes the plunger chamber P, and a rod 106 connected to the plunger 103.

The rod 106 is inserted and secured in a through-hole 103a extending along the center axis line of the plunger 103, and extends on the center post 104 side. Further, the center post 104 also has a through-hole 104a extending along the center axis line thereof, and the rod 106 is inserted into this through-hole 104a through the intermediation of a bearing so as to be capable of reciprocating such that its forward end portion protrudes outwardly.

And, as stated above, a valve or the like (not shown) is connected to the forward end of this rod 106, and is operated in accordance with the movement of the rod 106.

In this solenoid 100, normally, that is, when the solenoid main body 101 is not being energized, the plunger 103 is moved to the cap 105 side through the rod 106 due to the pressure of the external fluid such as oil or the force of a spring for returning the rod 106 in the valve or the like.

And, when the solenoid main body 101 is being energized, the plunger 103 is magnetically attracted to the center post 104, whereby the rod 106 connected to the plunger 103 moves to the left in the drawing to thereby drive the valve or the like.

Since the solenoid 100 is mounted in oil in a liquid-tight fashion, the oil may offer resistance when operating the plunger 103, thereby affecting the responsiveness of the plunger.

In order that the responsiveness of the plunger 103 may not be affected, there are provided oil holes 104b and 103b extending axially through the center post 104 and the plunger 103, respectively, whereby the oil from the exterior (P0) of the solenoid 100 flows through the oil hole 104b, the portion (P1) between the center post 104 and the plunger 103, and the oil hole 103b to the portion (P2) between the plunger 103 and the cap 105.

That is, in this case, the external oil moves as follows: P0→P1 and P1→P2 due to the movement of the plunger 103 (See the arrows in the drawing).

Although this construction helps to achieve an improvement in responsiveness, there still remains a problem in terms of durability due to abrasion or the like.

That is, as a result of wear of the valve or the like, a large amount of contaminants exist in the oil.

In particular, in the case where the flow passage as described above is formed, contaminants are likely to gather in the portion (P1) between the center post 104 and the plunger 103. This is because this portion constitutes a part of a magnetic path and is magnetized.

Thus, when the contaminants accumulated in this portion enter the portion where the plunger 103 slides, the plunger 103 is further worn, and the control characteristics can be adversely affected.

In view of this, the present applicant has filed a patent application regarding a technique to solve the above problem. This technique is disclosed in Japanese Patent Application Laid-Open No. Hei 9-89145.

This technique will be described with reference to FIG. 12. FIG. 12 is a schematic sectional view of a conventional solenoid.

As shown in FIG. 12, in this solenoid, the rod 206 is equipped with a through-hole 206a for directly guiding the external fluid (oil) to the plunger chamber P.

Due to this construction, the external fluid flows from the exterior (Q0) of the solenoid through the through-hole 206a, the plunger chamber P (Q1), and an oil hole provided in the plunger to the portion (Q2) between the center post and the plunger.

Thus, the contaminants do not easily reach the portion (Q2) between the center post and the plunger, thus solving the above problem.

However, the above-described prior-art technique involves the following problem:

It is true that, by providing a through-hole serving as a flow passage in the rod, it is possible to some degree to achieve an improvement in abrasion resistance. However, it can happen that some of the contaminants contained in the fluid directly guided to the plunger chamber get into the plunger sliding portion, resulting in a deterioration in abrasion resistance.

Thus, to further stabilize and improve the control characteristics, there is a demand for a further improvement in abrasion resistance.

Therefore, the present invention has been made with a view toward solving the above problem in the conventional art. It is an object of the present invention to provide a high-quality solenoid in which an improvement has been achieved in abrasion resistance.

DISCLOSURE OF THE INVENTION

In accordance with the present invention, there is provided a solenoid, characterized in that the solenoid includes:

excitation means provided in a solenoid main body and excited through energization;

a center post secured in position inside the solenoid main body;

a plunger slidably provided in a bearing portion in a plunger chamber defined in the solenoid main body and adapted to be attracted to the center post by a magnetic force through excitation of the excitation means;

a fluid accumulating chamber provided substantially coaxially with the plunger chamber and on the opposite side of the center post through the intermediation of the plunger chamber; and a rod which is fixed to the inner periphery of a through-hole formed in the plunger, one end of which protrudes so as to reach the fluid outside the solenoid main body through a through-hole formed in the center post, and the other end of which protrudes so as to reach the interior of the fluid accumulating chamber, and that the rod has a through-hole for guiding the fluid outside the solenoid main body to the interior of the fluid accumulating chamber, and that a first cutoff portion separating the plunger chamber and the fluid accumulating chamber from each other is provided on the outer peripheral side of the rod.

Thus, when the plunger operates, outside fluid is guided to the fluid accumulating chamber through the through-hole formed in the rod, so that the operation of the plunger is not hindered by the pressure of the outside fluid. Thus, the solenoid is superior in responsiveness. Further, since the fluid guided to the fluid accumulating chamber is intercepted by the first cutoff portion, it does not directly enter the plunger chamber, and even if the fluid contains contaminants, it is possible to prevent the contaminants from entering the plunger sliding portion.

The first cutoff portion consists of an annular member, and the inner periphery of the annular member is caused to slide on the outer periphery of the rod, and, further, the outer periphery of the annular member is brought into close contact with the inner peripheral portion of the fluid accumulating portion, whereby the plunger chamber and the fluid accumulating chamber are separated from each other.

Due to this construction, it is possible to reduce the possibility of contaminants contained in the fluid entering the sliding portion between the inner periphery of the annular member and the outer periphery of the rod as compared with the possibility of contaminants contained in the fluid entering the sliding portion in the outer periphery of the plunger in the conventional structure in which the fluid is directly guided to the plunger chamber. That is, generally speaking, the dimensional error involved is larger and the gap can be so much the larger when something with a large diameter is supported by a bearing than when something with a small diameter is supported by a bearing.

It is desirable for the sliding portion between the inner periphery of the annular member and the outer periphery of the rod to be positioned outside the magnetic path formed when the excitation means is excited.

This makes it possible to prevent magnetic contaminants from being attracted to the sliding portion by magnetic force.

It is desirable to provide on the outer peripheral side of the rod a second cutoff portion separating the plunger chamber and the exterior of the solenoid main body from each other.

Thus, no fluid directly enters the plunger chamber from the exterior of the solenoid main body, further making it possible to prevent contaminants from entering the plunger sliding portion.

It is desirable for at least one of the first and second cutoff portions to be the bearing of the rod.

It is also desirable for at least one of the first and second cutoff portions to be a seal member sealing the outer periphery of the rod.

It is desirable to provide a filter in the through-hole formed in the rod.

Thus, it is possible to prevent contaminants or the like from entering the fluid accumulating chamber.

It is desirable to provide at the end of the rod on the fluid accumulating chamber side an elastic partition separating the fluid accumulating chamber and the interior of the through-hole from each other.

This helps to prevent intrusion of contaminants or the like into the fluid accumulating chamber.

BEST MODE FOR CARRYING OUT THE INVENTION (First Embodiment)

Figure 1:
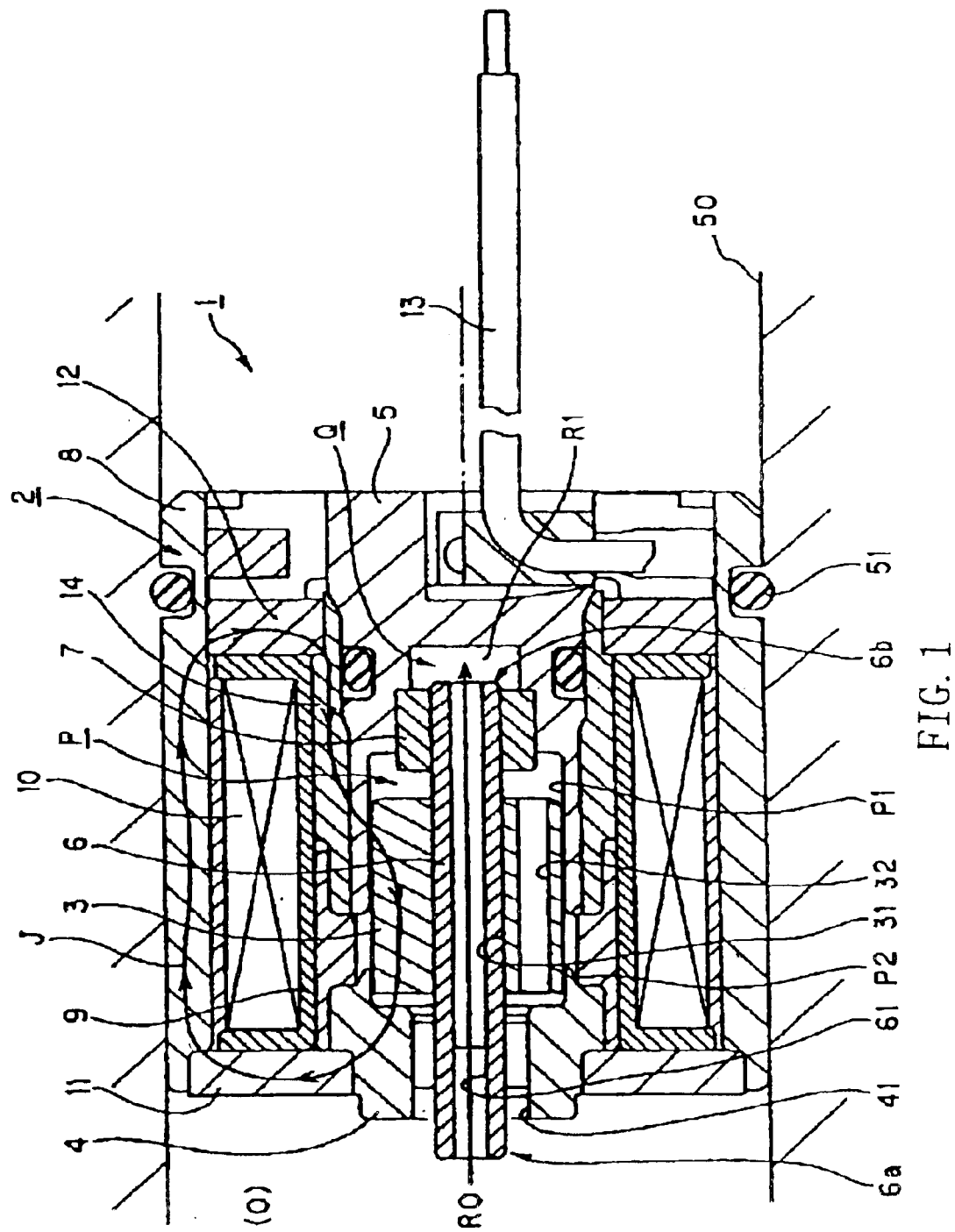
FIG. 1 is a schematic sectional view of a solenoid according to a first embodiment of the present invention.

A solenoid according to the first embodiment of the present invention will be described with reference to FIG. 1. FIG. 1 is a schematic sectional view of a solenoid according to the first embodiment of the present invention.

In FIG. 1, numeral 1 indicates the solenoid as a whole. This solenoid 1 is suitably used to drive, for example, a control valve (such as a spool valve for controlling hydraulic pressure or the like).

When thus using the solenoid 1 for hydraulic pressure control, the solenoid 1 is mounted in a liquid-tight fashion in a housing 50 filled with oil serving as the fluid through the intermediation of an O-ring 51. And a spool valve or the like (not shown) is mounted to the forward end of a rod 6 that is one of the components of the solenoid 1, and this spool valve or the like is driven by the solenoid 1 in a state in which it is immersed in the oil (O) to thereby effect hydraulic pressure control.

The solenoid 1 substantially comprises a hollow solenoid main body 2, a plunger 3 of a magnetic material slidably inserted into inner walls P1 and P2 (functioning as bearing portions) of a plunger chamber P formed inside the solenoid main body, a center post 4 of a magnetic material provided opposite to and coaxially with the plunger 3, a cap 5 provided on the opposite side of the center post 4 and adapted to close the plunger chamber P, and a rod 6 connected to the plunger 3.

Here, the solenoid main body 2 is equipped with a case 8 open at both ends, a coil 10 serving as an excitation means wound around a bobbin 9 which is accommodated in the case 8 and has a hollow portion, an upper plate 11 and a lower plate 12 serving as a magnetic path guide member provided at the upper and lower ends of the coil 10 through the intermediation of the bobbin 9, a lead wire 13 for energizing the coil 10, etc.

The upper plate 11 is an annular member for guiding the magnetic path from the center post 4 to the case 8, and is mounted such that its outer peripheral portion is in close contact with the portion near the open end of the case 8.

The lower plate 12 is an annular member for guiding the magnetic path from the case 8 to the plunger 3 through a sleeve 14, and is embedded on the opposite side of the upper plate 11 through the intermediation of the bobbin 9.

In the vicinity of the end portion of the bobbin 9 on the lower plate 12 side, there is provided a terminal or the like for electrically connecting the lead wire 13 and the coil 10, and the coil 10 is energized by an external power source (not shown) for excitation.

In the hollow portion of the bobbin 9, there is provided the sleeve 14 of a magnetic material, and in the inner periphery of this sleeve 14, one end portion of the cap 5 extends to form a part of the inner wall (inner wall P1) of the plunger chamber P. Similarly, one end portion of the center post 4 extends to form a part of the inner wall (inner wall P2) of the plunger chamber P. The inner walls P1 and P2 also function as bearing portions, and the plunger 3 is slidably inserted with respect to the inner walls P1 and P2.

Figure 2:
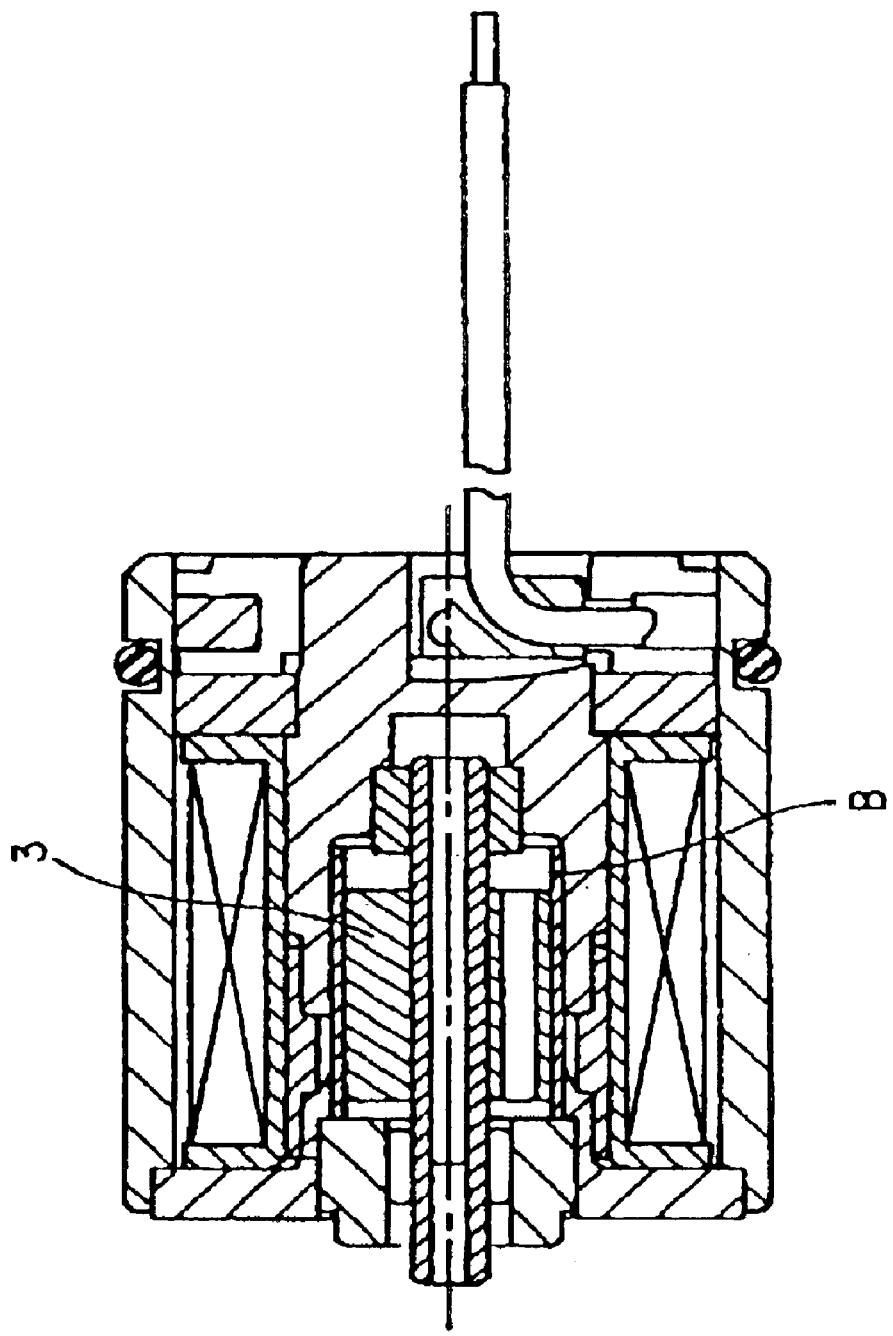
FIG. 2 is a schematic sectional view of a modification of a solenoid according to the first embodiment of the present invention.

As shown in FIG. 2, it is also possible to provide a sleeve B of a non-magnetic material on the inner side of the inner walls P1 and P2 and to use it as the bearing for the plunger 3. By thus forming the bearing by a single member, it is possible to slide the plunger 3 more smoothly.

Further, by the annular portion formed by extending one end portion of the above-mentioned cap 5, not only is a part of the plunger chamber P formed, but also a fluid accumulating chamber Q is formed substantially coaxially with the plunger chamber P and on the opposite side of the center post 4 through the intermediation of the plunger chamber P.

The inner diameter of the fluid accumulating chamber Q is smaller than the inner diameter of the plunger chamber P.

The plunger 3 has a through-hole 31 extending along the center axis thereof, and a rod 6 is inserted and secured in the through-hole 31 by forcing-in or the like.

One end portion 6a of this rod 6 extends on the center post 4 side through a through-hole 41 formed in the center post 4 to the exterior of the solenoid main body 2, reaching the fluid in the exterior.

The other end portion 6b of the rod 6 protrudes so as to reach the fluid accumulating chamber Q.

And the rod 6 has a through-hole 61 extending along the center axis thereof, and this through-hole 61 forms a flow passage for guiding the external fluid into the fluid accumulating chamber Q.

Further, a valve or the like (not shown) is connected to the forward end of the rod 6, and this valve or the like is operated in accordance with the movement of the rod 6.

And, on the outer peripheral side of the rod 6, there is provided a first bearing 7 serving as a first cutoff member for separating the plunger chamber P and the fluid accumulating chamber Q from each other. This first bearing 7 is an annular member, in the inner periphery of which the outer periphery of the rod 6 is slidably inserted, its outer periphery being in close contact with and secured to the inner periphery of the fluid accumulating chamber Q.

The diameter of the outer periphery of the first bearing 7 is smaller than the outer diameter of the plunger 3. Further, this first bearing 7 also functions as the bearing of the rod 6.

Further, the plunger 3 has a through-hole 32 allowing the fluid at the axial ends of the plunger 3 to flow.

Next, the operation, etc. of the solenoid 1, constructed as described above, will be described.

In this solenoid 1, in the normal state, that is, when the coil 10 is not being energized, the plunger 3 is caused to move to the cap 5 side through the rod 6 due to the pressure of the fluid such as hydraulic pressure of external control oil or the resilient force of a return spring (not shown) for the rod 6 provided in the valve or the like.

When the coil 10 is energized through the lead wire 13, the coil 10 is excited to form the magnetic path: the center post 4→the upper plate 11→the case 8→the lower plate 12→the sleeve 14→the plunger 3→the center post 4 (indicated by the arrow J; however, the drawing only shows a part of the magnetic path, and it goes without saying that the magnetic path is formed in the entire circumference) to thereby form a magnetic circuit.

As a result, a thrust due to a magnetic force is generated between the opposing surfaces of the plunger 3 and the center post 4, and the plunger 3 is magnetically attracted toward the center post 4, whereby the rod 6 connected to the plunger 3 also moves. Of course, the valve or the like mounted to the forward end of the rod 6 also moves.

Since the solenoid 1 is mounted liquid-tight to fluid, it is to be expected that when the plunger 3 operates, the fluid (usually consisting of oil) offers resistance to affect the responsiveness of the plunger. However, in the construction of this embodiment, the through-hole 61 is formed in the rod 6 to secure the flow passage, so that the responsiveness of the plunger 3 is not affected.

Further, in this embodiment, the through-hole 32 is provided in the plunger 3, so that the influence on the responsiveness is so much the less.

When the plunger 3 is driven, the external fluid flows between the exterior and the fluid accumulating chamber Q through the through-hole 61 provided in the rod 6. However, due to the provision of the first bearing 7, it does not directly flow into the plunger chamber P. That is, the external fluid flows between the portions R0 and R1 in the drawing.

Thus, even if the fluid contains contaminants, it is possible to prevent the contaminants from getting between the plunger 3 and the center post 4 and into the sliding surface of the plunger 3, so that it is possible to achieve an improvement in the abrasion resistance of the plunger 3 and an improvement in durability.

Thus, when the solenoid is used as a control valve, it is possible to stabilize and improve the control characteristics.

Further, as stated above, since sliding is effected between the inner periphery of the first bearing 7 and the outer periphery of the rod 6, the possibility of contaminants entering the sliding portion between the first bearing 7 and the outer periphery of the rod 6 can be lower than the possibility of contaminants contained in the fluid entering the sliding portion in the outer periphery of the plunger in the conventional construction in which the fluid is directly guided to the plunger chamber, which further contributes to achieving an improvement in abrasion resistance.

This is due to the fact that, generally speaking, the dimensional error involved is larger when something with a large diameter is supported by a bearing than when something with a small diameter is supported by a bearing, and that it is highly possible that the gap is so much the larger.

This problem cannot be solved by simply diminishing the plunger diameter. For, in the case of a plunger, it is necessary to meet limitation in dimension, etc. to some degree in order that the solenoid can function as such (by securing a sufficient magnetic path, etc.)

Further, by positioning the sliding portion between the first bearing 7 and the outer periphery of the rod 6 outside the magnetic path, it is possible to prevent magnetic contaminants from being attracted to this sliding portion, thereby further contributing to an improvement in abrasion resistance.

That is, some contaminants are magnetic, and can be attracted to and collected in a place where a magnetic path is formed. In this embodiment, a part of the flow passage or the sliding portion situated in the vicinity thereof is spaced apart from the magnetic path, whereby the above problem can be eliminated.

While in the above-described example the inner walls for forming the plunger chamber P, functioning as the bearing of the plunger 3, are formed by a part of the cap 5 (the inner wall P1) and a part of the center post 4 (the inner wall P2), the inner wall should not, of course, be restricted to be constructed in such a way.

(Second Embodiment)

Figure 3:
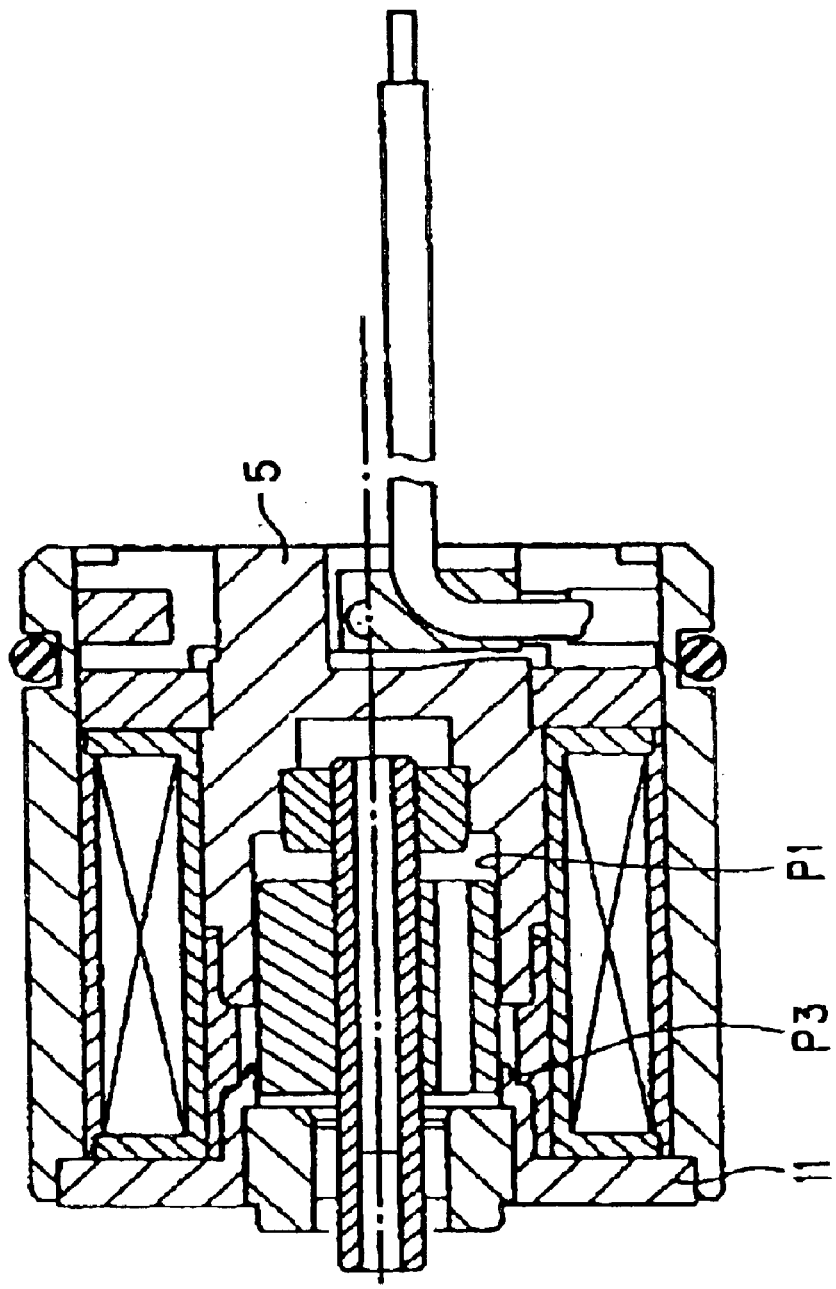
FIG. 3 is a schematic sectional view of a solenoid according to a second embodiment of the present invention.

In the second embodiment shown, for example, in FIG. 3, it is possible to form the above-mentioned inner walls by a part of the cap 5 (the inner wall P1) and an inner wall P3 formed by extending one end portion of the upper plate 11.

(Third Embodiment)

Figure 4:
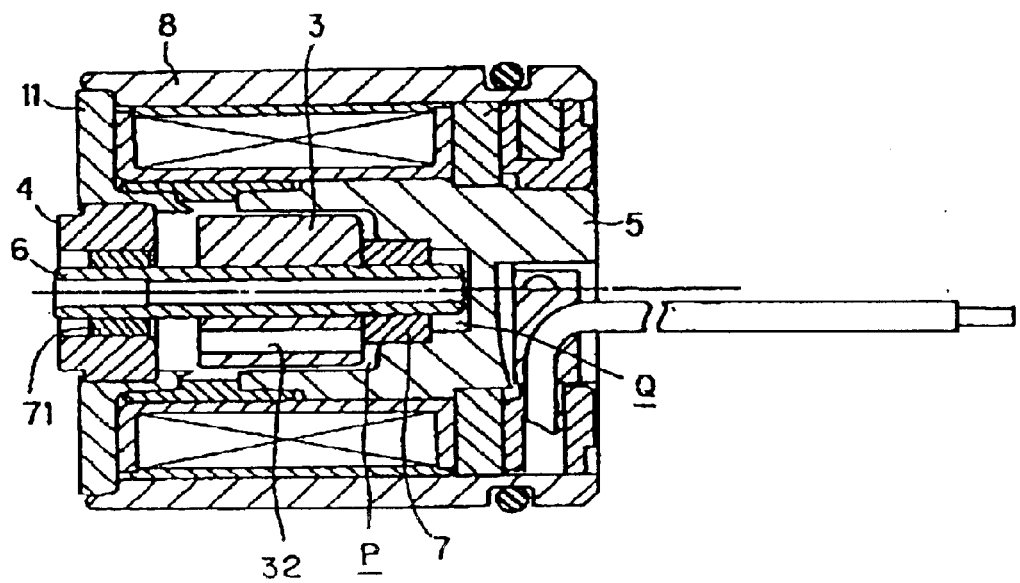
FIG. 4 is a schematic sectional view of a solenoid according to a third embodiment of the present invention.

FIG. 4 is a schematic sectional view of a solenoid according to the third embodiment.

In the example shown in FIG. 4, of the bearings of the rod 6, the second bearing 71 on the oil (O) side is utilized as a cutoff member (second cutoff member) for separating the exterior of the solenoid main body 2 and the plunger chamber P from each other, whereby it is possible to prevent external fluid from directly flowing into the plunger chamber P.

Thus, even if the fluid contains contaminants, it is possible to prevent the contaminants from getting between the plunger 3 and the center post 4 and into the sliding surface of the plunger 3, so that it is possible to achieve an improvement in the abrasion resistance of the plunger 3 and an improvement in durability.

(Fourth Embodiment)

While in the above-described embodiment a bearing is used as the cutoff member, anything will do as long as it can effect separation. It is also possible to use a dedicated seal member.

Figure 5:
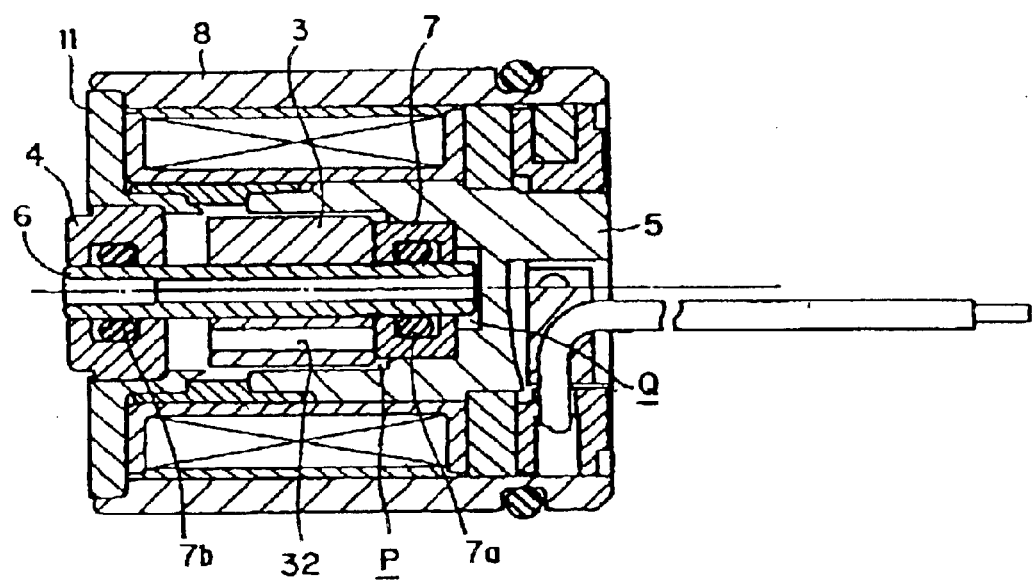
FIG. 5 is a schematic sectional view of a solenoid according to a fourth embodiment of the present invention.
Figure 6:
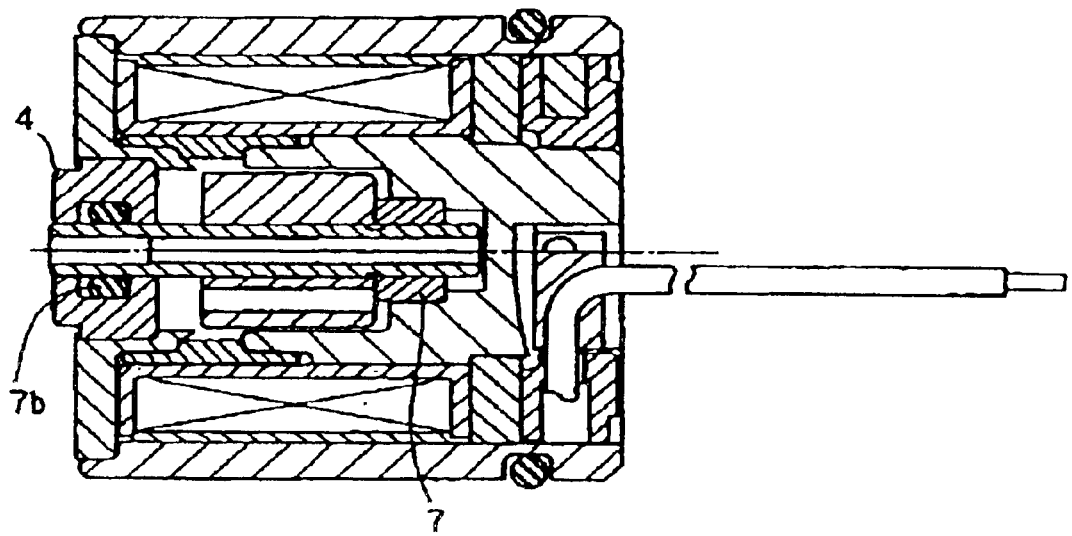
FIG. 6 is a schematic sectional view of a solenoid according to the fourth embodiment of the present invention.
Figure 7:
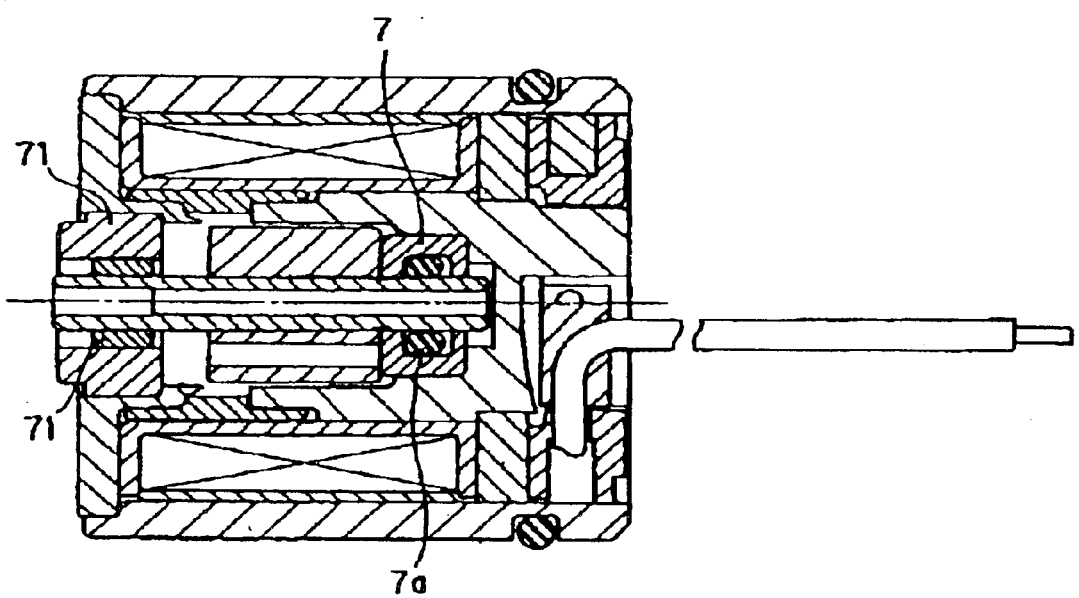
FIG. 7 is a schematic sectional view of a solenoid according to the fourth embodiment of the present invention.

Such cases will be described with reference to FIGS. 5 through 7. FIGS. 5 through 7 are schematic sectional views of solenoids according to the fourth embodiment of the present invention.

It goes without saying that the same effect can be obtained when, for example, as shown in FIG. 5, mounting grooves are respectively provided in the center post 4 and the first bearing 7, and O-rings 7a and 7b serving as seal members are provided therein.

The same effect can also be obtained when, as shown in FIG. 6, the O-ring 7b is provided only on the center post 4 side, or when, as shown in FIG. 7, the O-ring 7a is provided only in the first bearing 7.

(Fifth Embodiment)

Figure 8:
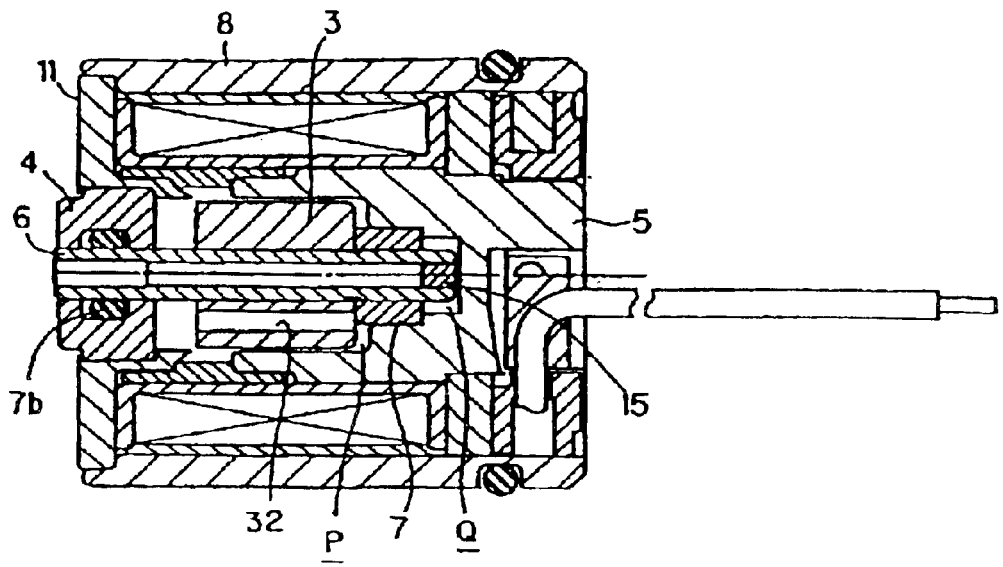
FIG. 8 is a schematic sectional view of a solenoid according to a fifth embodiment of the present invention.

FIG. 8 is a schematic sectional view of a solenoid according to the fifth embodiment of the present invention.

In this embodiment, a filter 15 is provided in the through-hole 61 formed in the rod 6.

Due to the provision of the filter 15, it is possible to intercept contaminants or the like contained in the fluid, so that it is possible to prevent contaminants or the like from entering the fluid accumulating chamber Q.

Thus, it is possible to further improve the abrasion resistance of the plunger 3, making it possible to achieve an improvement in terms of durability.

In the structures of the above-described embodiments, contaminants are hard to discharge from the fluid accumulating chamber Q once they have entered it, whereas, in this embodiment, it is possible to prevent contaminants from entering the fluid accumulating chamber, which proves effective.

While the example shown in FIG. 8 is applied to the type of structure shown in FIG. 5 referred to in the description of the fourth embodiment, an application of this embodiment is not limited to such a case. It can also be applied to the types of structure shown in FIGS. 1 through 5 and 7.

(Sixth Embodiment)

Figure 9:
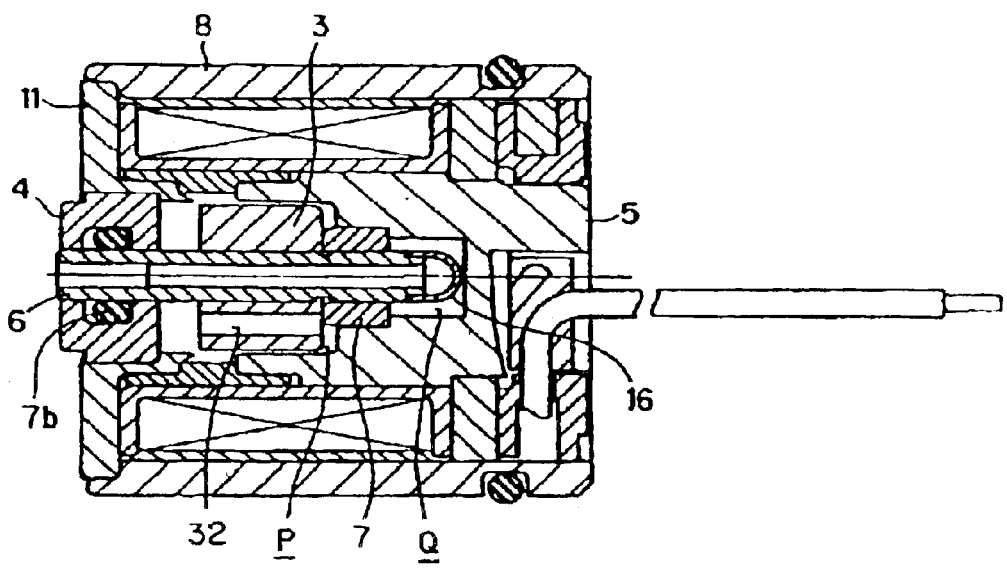
FIG. 9 is a schematic sectional view of a solenoid according to a sixth embodiment of the present invention.

FIG. 9 is a schematic sectional view of a solenoid according to the sixth embodiment of the present invention.

In this embodiment, at the end of the rod 6 on the fluid accumulating chamber Q side, there is provided a diaphragm 16 serving as an elastic partition separating the fluid accumulating chamber Q and the interior of the through-hole 61 from each other.

Due to the provision of the diaphragm 16, it is possible to intercept contaminants or the like contained in the fluid, so that it is possible to prevent contaminants or the like from entering the fluid accumulating chamber Q.

Thus, it is possible to further improve the abrasion resistance of the plunger 3, making it possible to achieve an improvement in terms of durability.

Further, when fluid flows into the through-hole 32 as a result of the reciprocation of the plunger 3, the diaphragm 16 is deformed in accordance with the amount of fluid flowing in to vary the fluid accommodation volume, so that the plunger operation is not hindered by the pressure of the external fluid, and a satisfactory responsiveness is achieved.

While in the example shown in FIG. 9 this embodiment is applied to the type of structure shown in FIG. 6 referred to in the description of the fourth embodiment, an application of this embodiment is not limited to such a case. It can also be applied to the types of structure shown in FIGS. 1 through 5 and 7.

(Seventh Embodiment)

Figure 10:
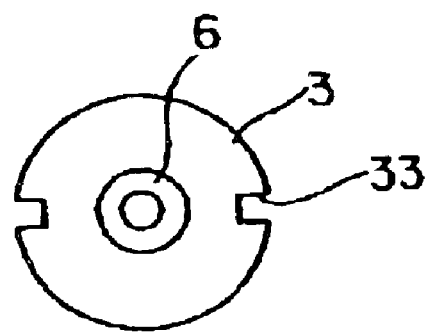
FIG. 10 is a schematic diagram showing a plunger constituting a solenoid according to a seventh embodiment of the present invention.
Figure 10:
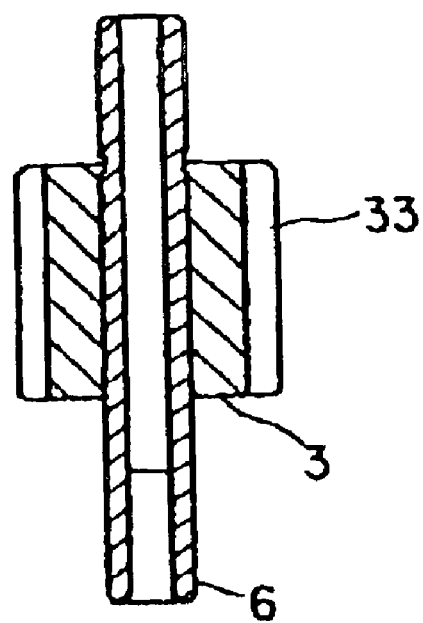
Figure 11:
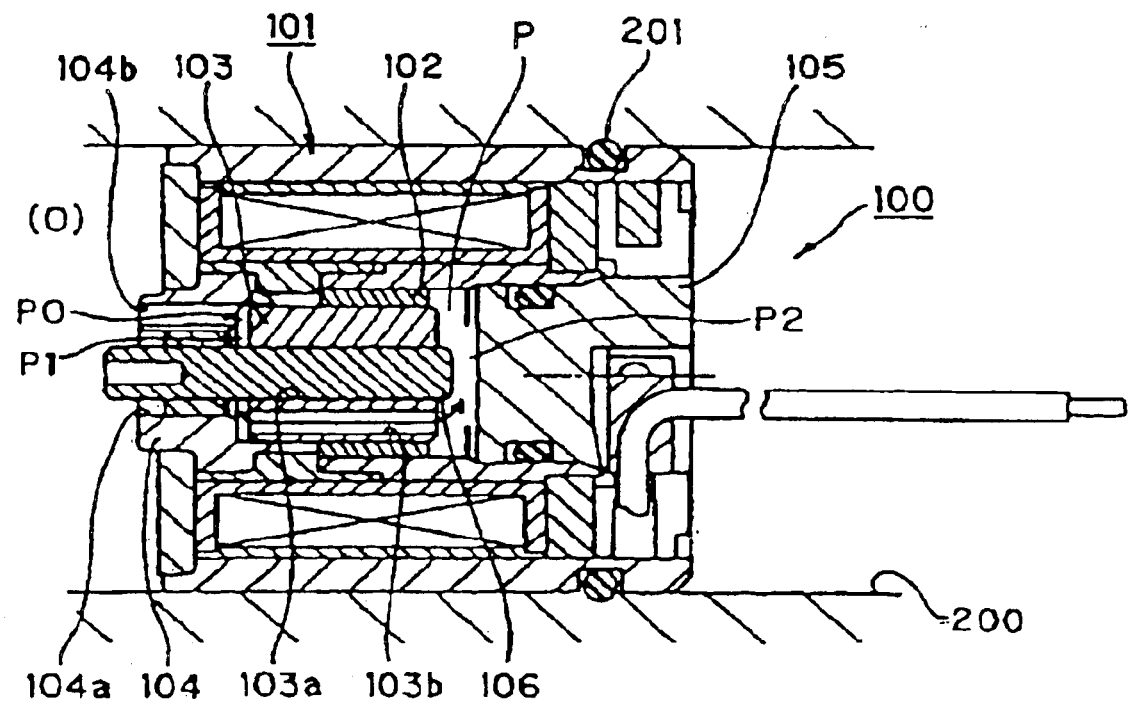
FIG. 11 is a schematic sectional view of a conventional solenoid.
Figure 12:
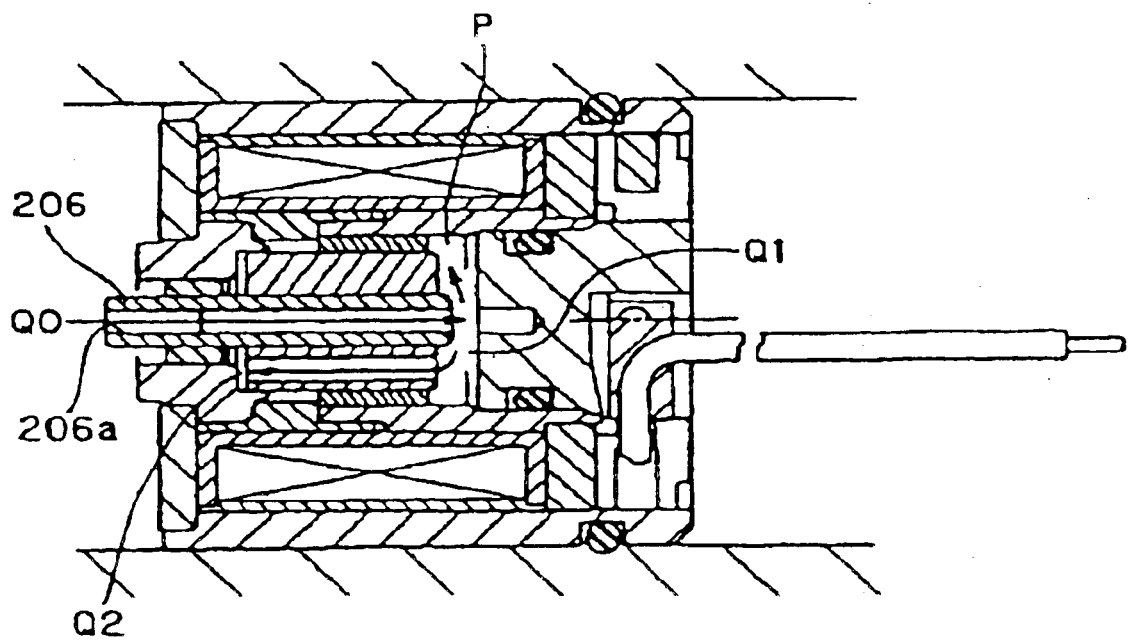
FIG. 12 is a schematic sectional view of a conventional solenoid.

FIG. 10 is a schematic diagram showing a plunger constituting a solenoid according to the seventh embodiment of the present invention (FIG. 10A is a plan view and FIG. 10B is a sectional view).

While in the examples referred to in the description of the above embodiments the through-hole 32 provided in the plunger 3 constitutes the flow passage formed in the plunger 3, it is also possible, as shown in FIG. 10, to provide a slit 33 and to use it as the flow passage.

INDUSTRIAL APPLICABILITY

As described above, in the present invention, the rod has a through-hole for guiding the fluid outside the solenoid main body to the interior of the fluid accumulating chamber, whereby a superior responsiveness is achieved. Further, on the outer peripheral side of the rod, there is provided a first cutoff portion for separating the plunger chamber and the fluid accumulating chamber from each other, so that it is possible to prevent fluid from directly entering the plunger chamber, making it possible to prevent contaminants from entering the plunger sliding portion, whereby an improvement in abrasion resistance is achieved and a superior quality is obtained.

When the cutoff portion consists of an annular member, and its inner periphery is caused to slide on the rod outer periphery, it is possible to reduce the possibility of contaminants entering the sliding portion.

When the portion where the inner periphery of the annular member slides on the rod outer periphery is positioned outside the magnetic path, it is possible to prevent magnetic contaminants from being attracted to the sliding portion by a magnetic force.

On the outer peripheral side of the rod, there is provided a second cutoff portion separating the plunger chamber and the exterior of the solenoid main body from each other, whereby it is possible to more reliably prevent contaminants from entering the plunger sliding portion.

By providing a filter in the through-hole formed in the rod, it is possible to prevent contaminants or the like from entering the fluid accumulating chamber.

Also, by providing at the end of the rod on the fluid accumulating chamber side an elastic partition separating the fluid accumulating chamber and the interior of the through-hole from each other, it is possible to prevent contaminants or the like from entering the fluid accumulating chamber.

What is claimed is:

1. A solenoid, characterized in that the solenoid comprises:
    excitation means provided in a solenoid main body and excited through energization;
    a center post secured in position inside the solenoid main body;
    a plunger slidably provided in a bearing portion in a plunger chamber defined in the solenoid main body and adapted to be attracted to said center post by a magnetic force through excitation of said excitation means;
    a fluid accumulating chamber provided substantially coaxially with said plunger chamber and on the opposite side of said center post through the intermediation of the plunger chamber; and
    a rod which is fixed to the inner periphery of a through-hole formed in said plunger, one end of which protrudes so as to reach the fluid outside the solenoid main body through a through-hole formed in said center post, and the other end of which protrudes so as to reach the interior of said fluid accumulating chamber, and
    that said rod has a through-hole for guiding the fluid outside said solenoid main body only to the interior of said fluid accumulating chamber, and
    that a first cutoff portion separating said plunger chamber and the fluid accumulating chamber from each other is provided on and is in contact with the outer peripheral side of said rod.

2. The solenoid according to claim 1, characterized in that said first cutoff portion consists of an annular member, and the inner periphery of the annular member is caused to slide on the outer periphery of said rod, and, further, the outer periphery of the annular member is brought into close contact with the inner peripheral portion of said fluid accumulating portion, whereby said plunger chamber and the fluid accumulating chamber are separated from each other.

3. The solenoid according to claim 1, characterized in that the sliding portion between the inner periphery of said annular member and the outer periphery of said rod is positioned outside the magnetic path formed when said excitation means is excited.

4. The solenoid according to claim 1, characterized in that a second cutoff portion is provided on the outer peripheral side of said rod, separating said plunger chamber and the exterior of the solenoid main body from each other.

5. The solenoid according to claim 1, characterized in that at least one of said first and second cutoff portions is the bearing of said rod.

6. The solenoid according to claim 1, characterized in that at least one of said first and second cutoff portions is a seal member sealing the outer periphery of said rod.

7. The solenoid according to claim 1, characterized in that a filter is provided in the through-hole formed in said rod.

8. The solenoid according to claim 1, characterized in that an elastic partition is provided at the end of said rod on the fluid accumulating chamber side, separating the fluid accumulating chamber and the interior of said through-hole from each other.

* * * * *